United States Patent
Pelella

(10) Patent No.: US 6,646,544 B1
(45) Date of Patent: Nov. 11, 2003

(54) SELF TIMED PRE-CHARGED ADDRESS COMPARE LOGIC CIRCUIT

(75) Inventor: Antonio R. Pelella, Highland Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/140,718

(22) Filed: May 8, 2002

(51) Int. Cl.[7] .................................................. G05B 1/00
(52) U.S. Cl. ..................................................... 340/146.2
(58) Field of Search ....................................... 340/146.2

(56) References Cited

U.S. PATENT DOCUMENTS

| | | | |
|---|---|---|---|
| 5,765,194 A | 6/1998 | McBride | 711/138 |
| 6,054,918 A | * 4/2000 | Holst | 340/146.2 |
| 6,055,611 A | 4/2000 | Wright et al. | 711/162 |
| 6,353,558 B1 | 3/2002 | Lattimore et al. | 365/189.07 |

* cited by examiner

Primary Examiner—Margaret R. Wambach
(74) Attorney, Agent, or Firm—Lynn L. Augspurger

(57) ABSTRACT

An Address Compare Circuit (1) allows for a large compare function at high speed due to its unique self-timed evaluation clock and bit compare circuits. The address compare circuit can reliably self-time off of the input data which insures proper compare timing with respect to the arrival of two address busses being compared. The HIT evaluation clock is generated by a circuit that has additional control inputs to increase the arrival times of input data, resulting in a greater operating window. This circuit provides a way to generate a very accurate internal HIT evaluation clock; therefore, the compare circuit reduces the extra setup time needed to guarantee all address data bits are valid. Furthermore, the HIT evaluation clock can be delayed to increase the arrival times of input data, resulting in a greater operating window.

8 Claims, 12 Drawing Sheets

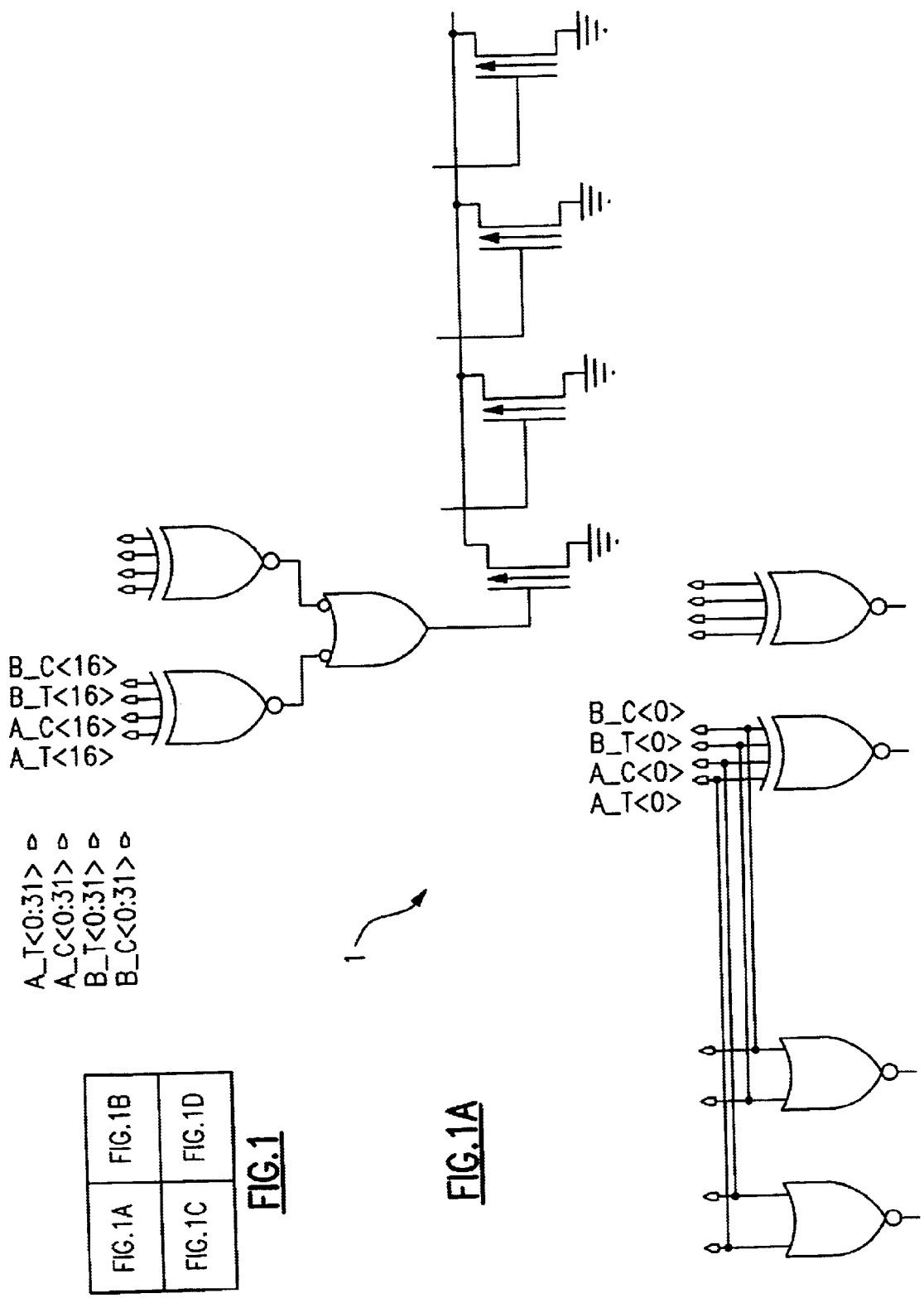

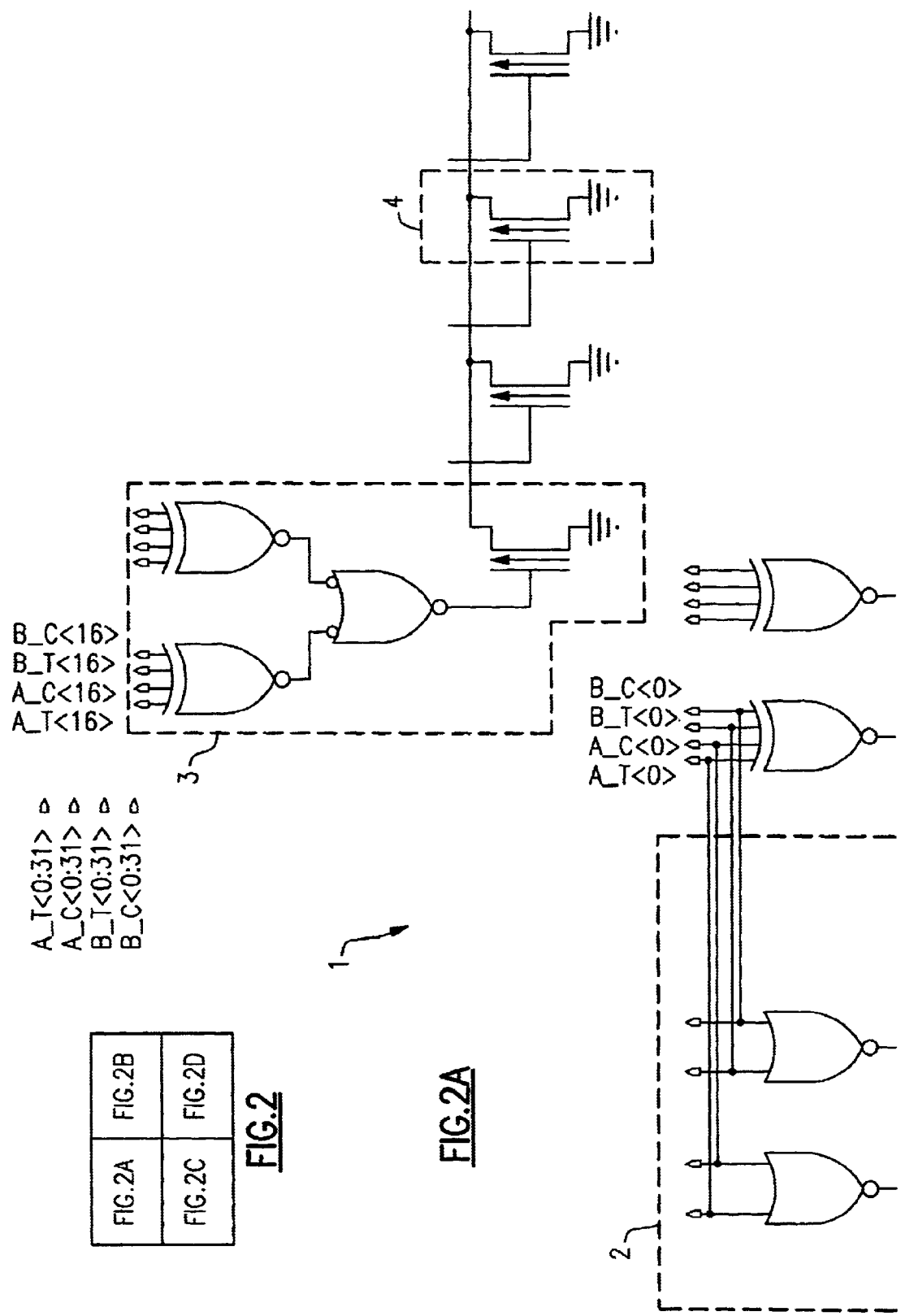

SELF TIMED PRE-CHARGED ADDRESS COMPARE LOGIC CIRCUIT

FIELD OF THE INVENTION

The present invention generally relates to an address compare circuit to test the equivalence of two addresses each made up of the same number of bits. Furthermore, the speed at which this compare is performed is of the highest priority.

Trademarks: IBM is a registered trademark of International Business Machines Corporation, Armonk, N.Y., U.S.A. Other names may be registered trademarks or product names of International Business Machines Corporation or other companies.

BACKGROUND

In computer design, it is common to compare two addresses in order to determine the validity of a preceding or subsequent operation. For example, the address (of a portion of data needed to execute an instruction) is compared to an address stored in a directory register to determine if a local Cache SRAM is holding a copy of the data.

In general, there are two primary ways to implement the compare logic:
1. Bit-by-bit compare, then "AND" each Bit-by-bit compare together: Before a compare operation begins, the output of the compare circuit indicates a mismatch or "MISS" state. Once the operation begins, the two addresses are compared "bit by bit". Next, each bit compare is "ANDed" together forming a "AND" tree usually taking 2 or more stages. If the address is the same, the compare circuit indicates a match (or "HIT"). Otherwise an inactive state or "MISS" is indicated by the compare circuit.
2. Bit-by-bit miscompare, then "OR" each Bit-by-bit miscompare together: Before a compare operation begins, the output of the compare circuit indicates a match or "HIT" state. Once the operation begins, the two addresses are compared "bit by bit". Next, each bit miscompare is "ORed" together forming a "OR" tree usually taking 2 or more stages. If the address is the same, the compare circuit output will maintain the a match (or "HIT"). Otherwise an MISS" is indicated by the compare circuit.

The disadvantage of first method is the "AND" logic uses series transistors which tend to be slow to operate. Although, this method can use traditional static CMOS logic gates which are relatively easy to implement, the speed disadvantage is hard to over come.

The disadvantage of the second method is the compare circuit indicates a "HIT" prior to the actual compare operation. For, example, if downstream logic is dynamic in nature, dynamic logic may not tolerate a HIT at its inputs during its pre-charge. This overlap of signals or "collision" can cause false HIT related operations to occur. Nevertheless, the "OR" logic is preferred, since it uses parallel transistors and tend to operate quickly.

To take advantage of the second method's speed while avoiding the collision problems, a HIT evaluation clock (HIT clock) is introduced. The HIT clock is used to trigger the last stage of the "OR" tree. As a result, the compare circuit output will start in the MISS state and will only switch to the HIT state when both addresses match and the HIT clock is active. However, the timing of the HIT clock is not easily accomplished.

Generally, in there patented art, U.S. Pat. No. 6,353,558, it is noted that specifically describes a method for reading and writing a memory array during the same clock cycle with the same decoded address. The present invention, which is concerned mainly with the self timed nature of a high-speed compare function differs and the "to compare" function is not addressed in this art, and furthermore, the preferred embodiment provides new self timed features which allow for higher speed operation.

Another patent, specifically U.S. Pat. No. 6,055,611, generally relates to the enabling of memory cells and more particularly relates to effectively replacing defective portion of memory array with despair portion, again does not address the preferred embodiment featues, no how the self timed compare function is achieved, nor how the self timed features allows for higher speed operation. This is also true of U.S. Pat. No. 5,765,194 which generally relates to a compare circuit and to timing between an address "MISS" and with a "forced" MISS.

SUMMARY OF THE INVENTION

The preferred embodiment of the invention provides an improvement in an address compare circuits and provides a compare circuit that can reliably self-timed off of the input data insuring proper compare timing with respect to the arrival of the two addresses being compared. This circuit provides a way to generate a very accurate internal HIT evaluation clock; therefore, the compare circuit reduces the extra setup time needed to guarantee all address data bits are valid. Furthermore, the HIT evaluation clock can be delayed to increase the arrival times of input data, resulting in a greater operating window.

Also, the improved address compare circuit of the preferred embodiment allows for large "OR" structures which reduce circuit stages resulting in faster overall circuit performance. Furthermore, when the number of bits being compared is increased, the overall delay increase is marginal due to the "OR" structures.

The present invention primarily uses dynamic input data ( i.e. the inputs "return-to-zero" at the end of each cycle); however, if the inputs originate as "static" inputs to the compare circuit, then these static inputs are first preconditioned at the input receiver (i.e. a input repowering circuit), so when they arrive at the compare circuitry, they now have the necessary characteristic of a "return-to-zero" at the end of each cycle.

This preferred embodiment lends itself to very large compare compare operations (60 inputs and grater) with only marginal delay increase when the number of bits being compared is increased. There is use of dynamic input data, ( i.e. "return-to-zero" at the end of each cycle); however, if the inputs originate as "static" inputs to the Compare circuit, then these static inputs are first preconditioned at the input receiver (i.e. re-buffering circuit), so when they arrive at the Compare circuit, they now have the necessary characteristic of a "return-to-zero" at the end of each cycle. The self-timed hit evaluation clock, which is generated by the rising edges of the input data, triggers an evaluation of the compare circuit. This evaluation clock circuit is designed is such a way so that it tracks the compare circuit delay even when simulation models have wide tolerance's. This is accomplished by mimicking the actual compare circuit with similar transistor topologies.

These and other improvements are set forth in the following detailed description. For a better understanding of the invention with advantages and features, refer to the description and to the drawings.

The detailed description explains the preferred embodiments, together with advantages and features, by way of example with reference to the drawings.

DETAILED DESCRIPTION OF THE INVENTION

Figure 1B:
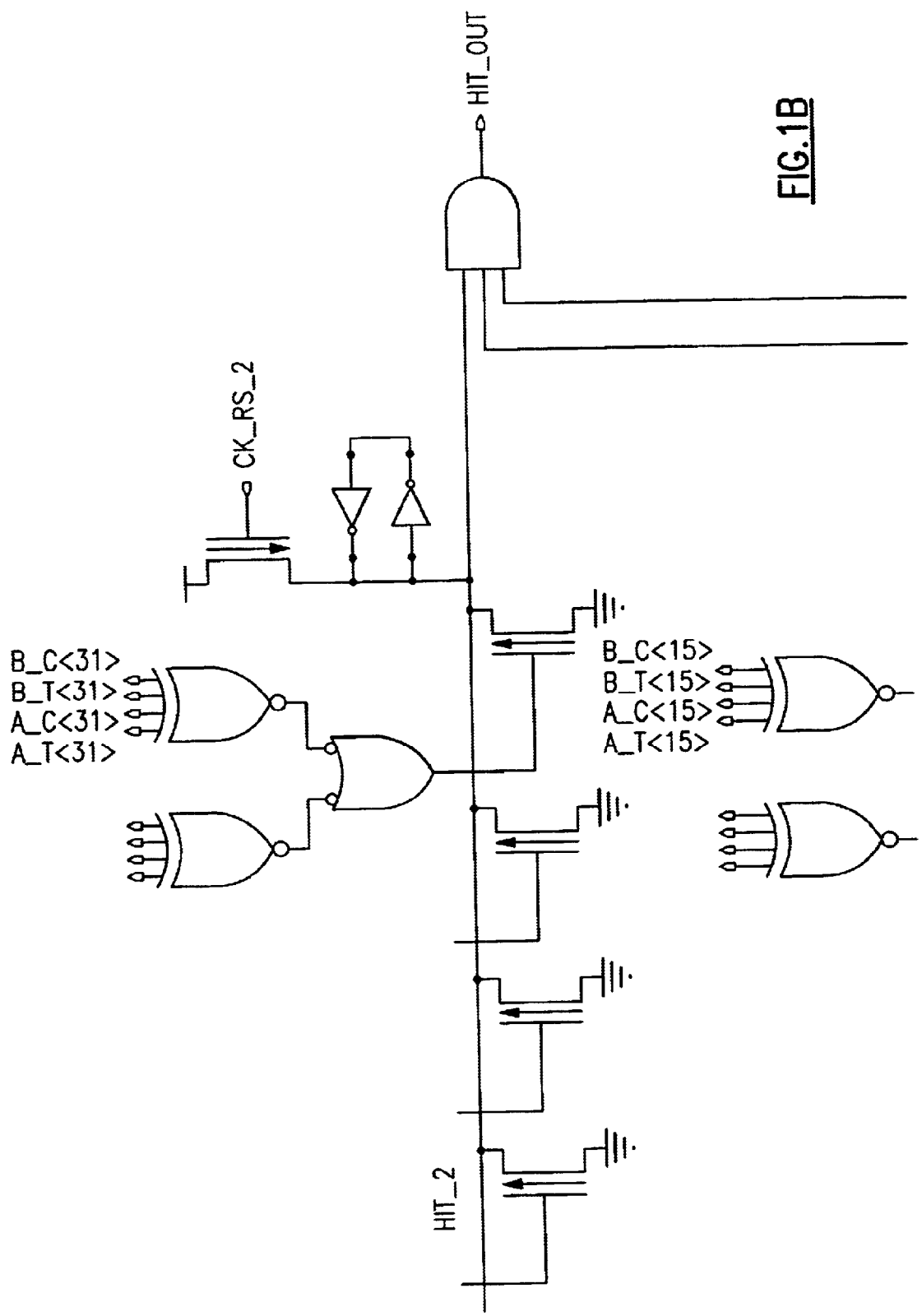
FIG. 1 illustrates the overall address compare circuit used in the present invention.
Figure 1C:
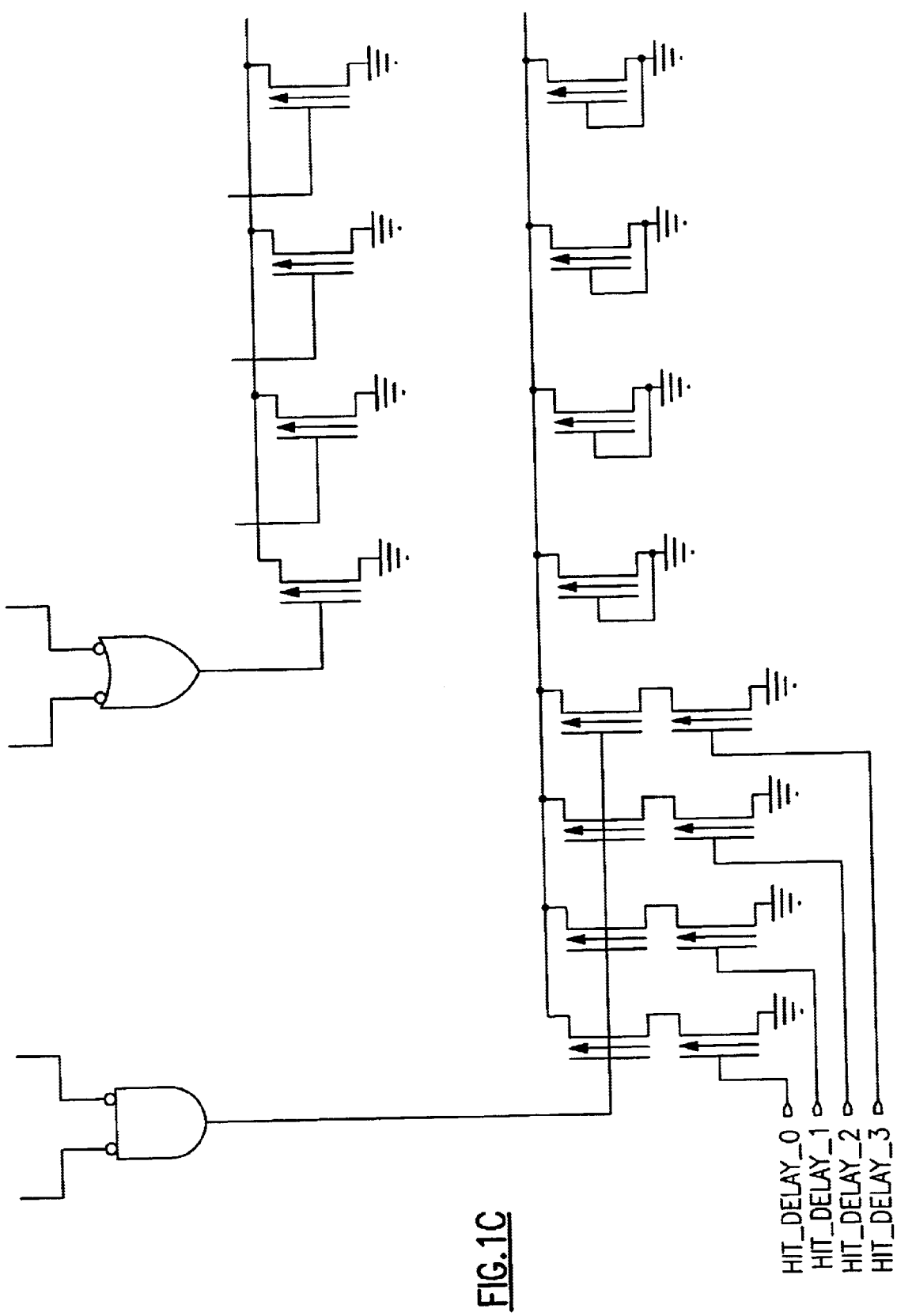
Figure 1D:
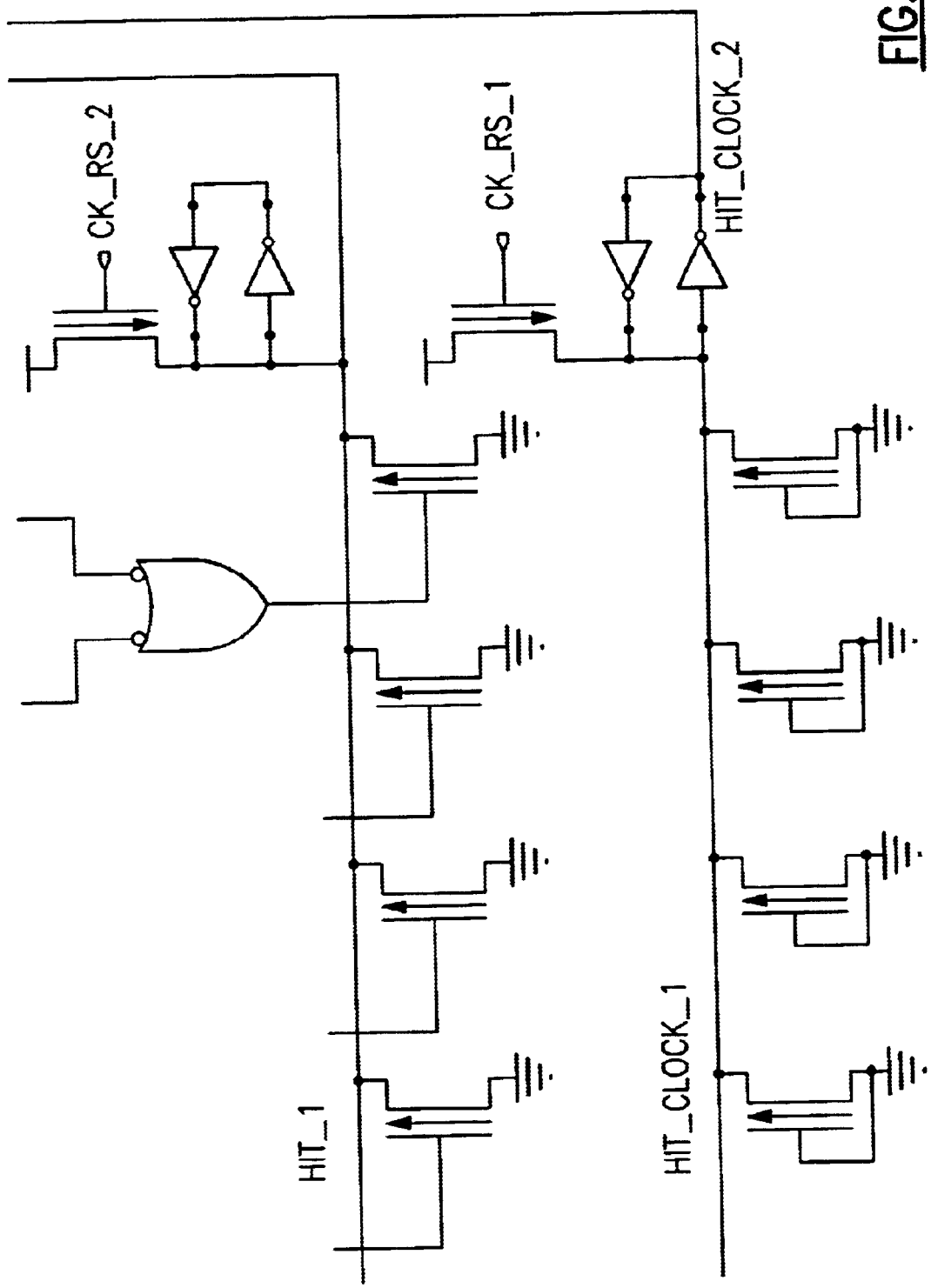

With reference to FIG. 1, an address compare circuit is shown, and for this discussion, two "32 bit wide" addresses, each having a true and complement component (i.e. A_t<0:31>, A_c<0:31>, and B_t<0:31>, B_c<0:31>) are being compared. If both addresses match, a "HIT" signal is indicated at the output of the compare circuit ($HIT_{OUT}$).

A compare operation occurs, as will be illustrated in FIG. 2 with with the major components highlighted for clarity, as follows:

At the beginning of an evaluation cycle the nodes labeled HIT1 and HIT2 are pre-charged to the "match" or "HIT" state by the reset clock "CK_RS_2" 5. If the nodes HIT1 and HIT2 remain high ("1") when the HIT clock ("HIT_CLOCK_2") switches to a "1", the result is an address match or "HIT". On the other hand, if HIT1 or HIT2 have been pulled "low" due to an address miscompare, the output "HIT_OUT" 7 will stay low (indicating a MISS).

The arrival of the incoming addresses is detected by the low-to-high transitions of the address data bits (i.e. either the true or complement of each bit will make a low-to-high transition every cycle). This will start the "bit compare" function 3 and the generation of the HIT clock "HIT_CLOCK_2". Only one bit from each address A & B, are used as the inputs to the HIT clock circuitry 2.

Figure 3:
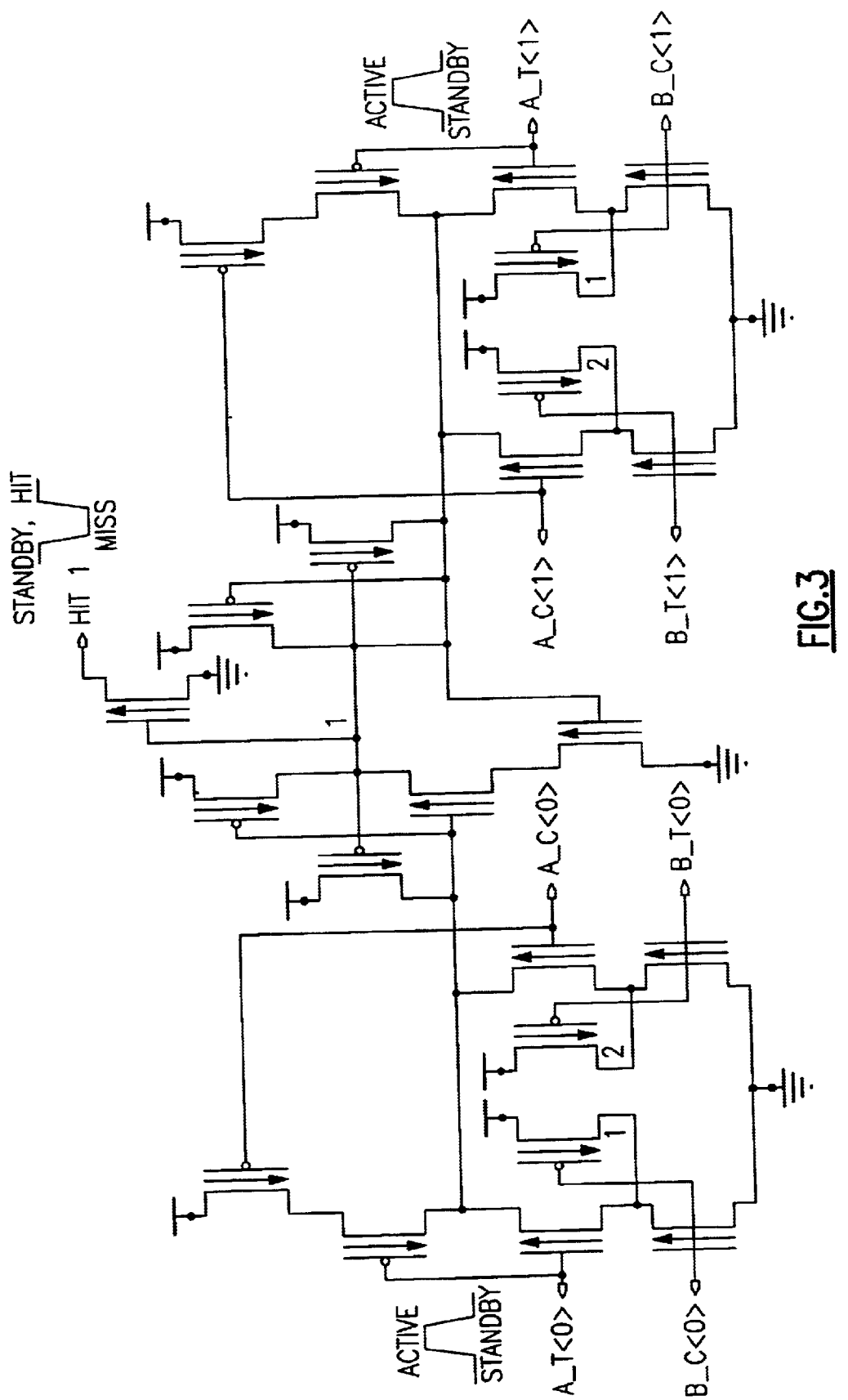
FIG. 3 illustrates the "bit compare" circuit used in the present invention.

Each "bit compare" circuit has a "open drain" output connection to the HIT_1 & HIT_2 lines 4; therefore, a 32 bit compare has eight "open drain" NFETS 4 connected to HIT1 and eight NFETS connected to HIT2. The "bit compare" schematic, shown in detail in FIG. 3, compares two address bits at a time for the purpose of illustration in the embodiment. However, it could easily be extended to a 4 or 8 way compare. Consequently, (referring to FIG. 3) if a miscompare is detected, the open drain output transistor, will pull the output voltage "HIT1" down to the "0" or ground state.

It should be noted that the open drain feature of the bit compare circuit for the self-timed address circuit that allows for large "OR" structures which reduce circuit stages resulting in faster overall circuit performance. Furthermore, this bit compare circuit experiences only marginal delay increases when the number of bits being compared are increased.

Figure 2B:
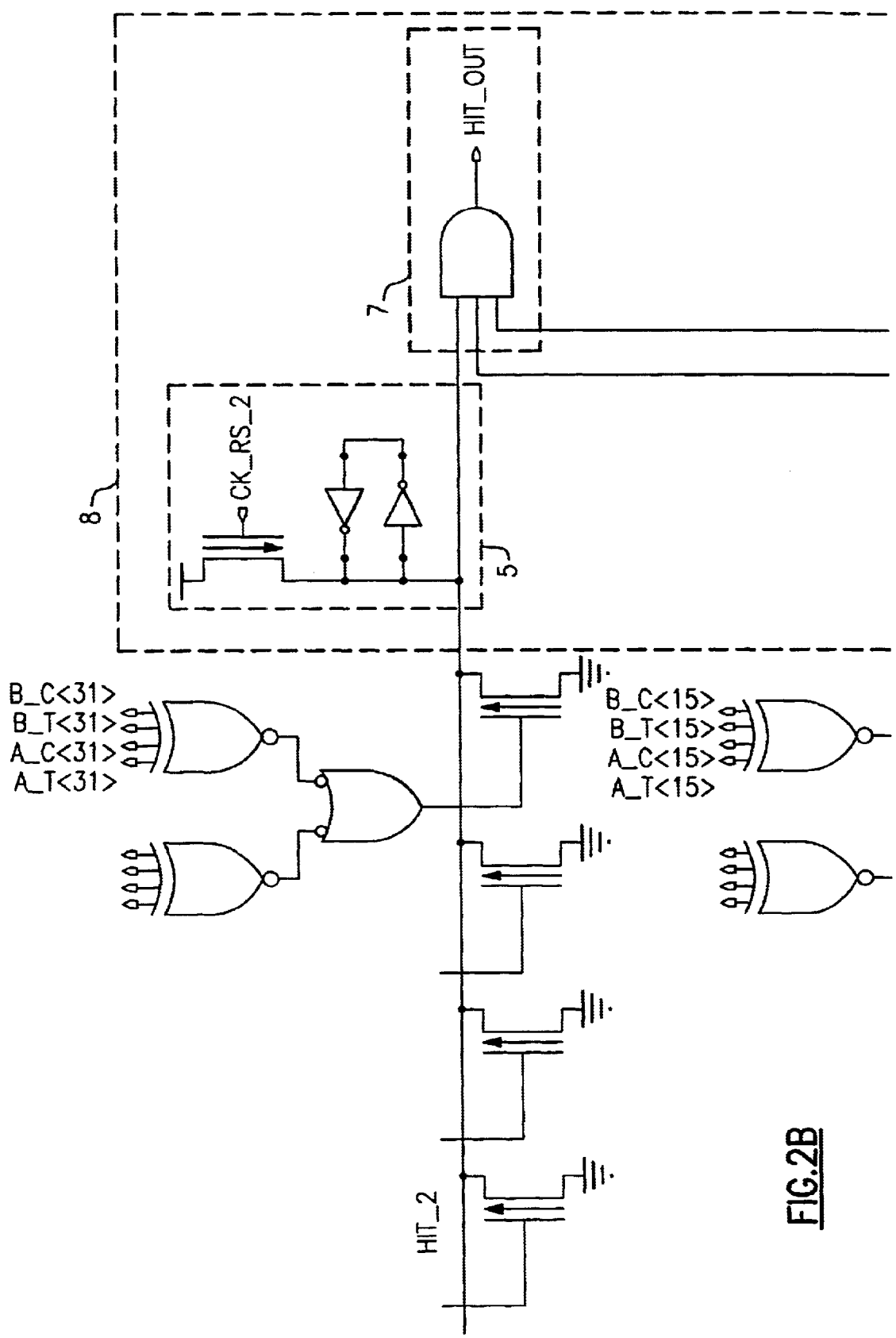
FIG. 2 illustrates the overall compare circuit with individual functions isolated for clarity
Figure 2C:
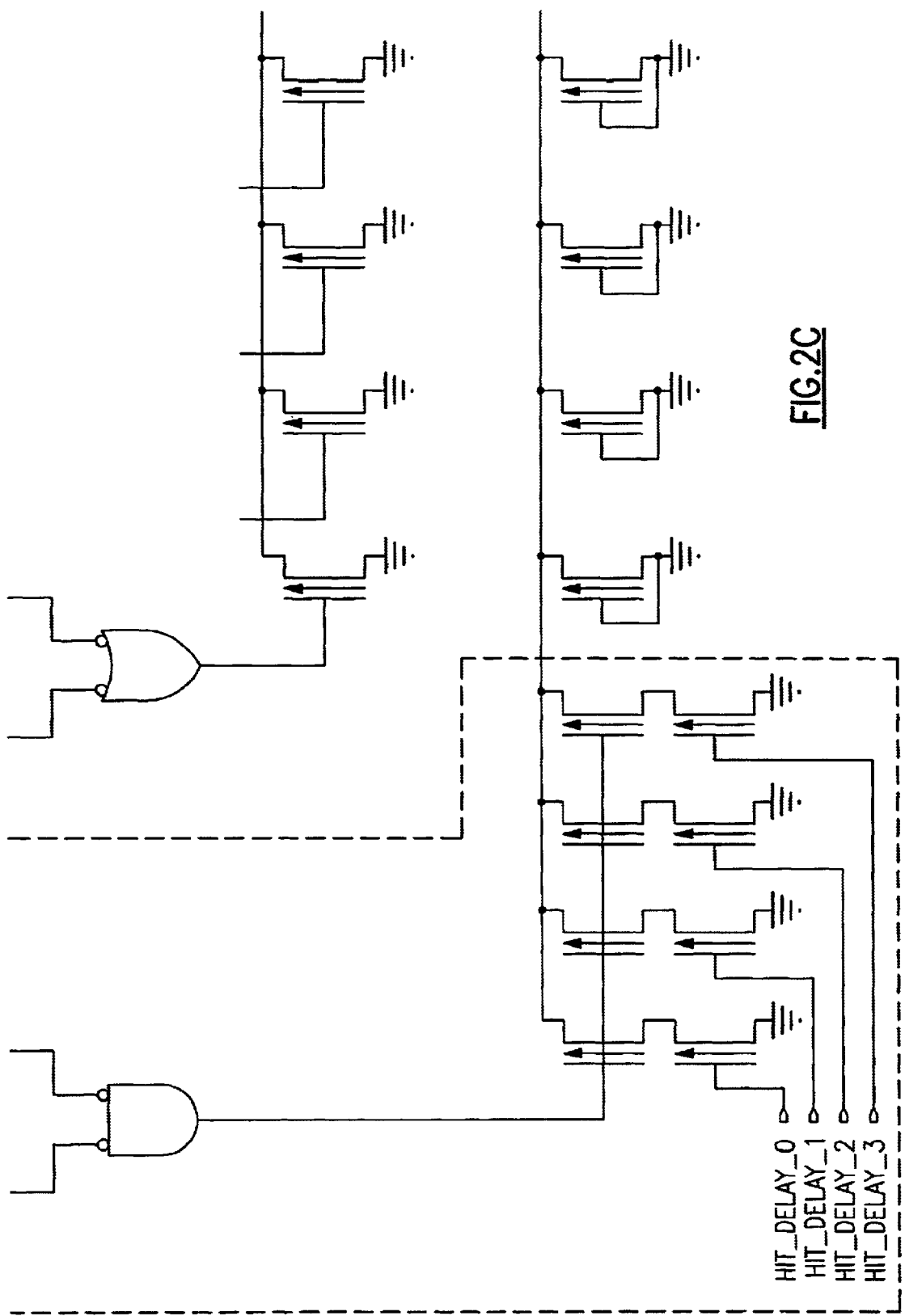
Figure 2D:
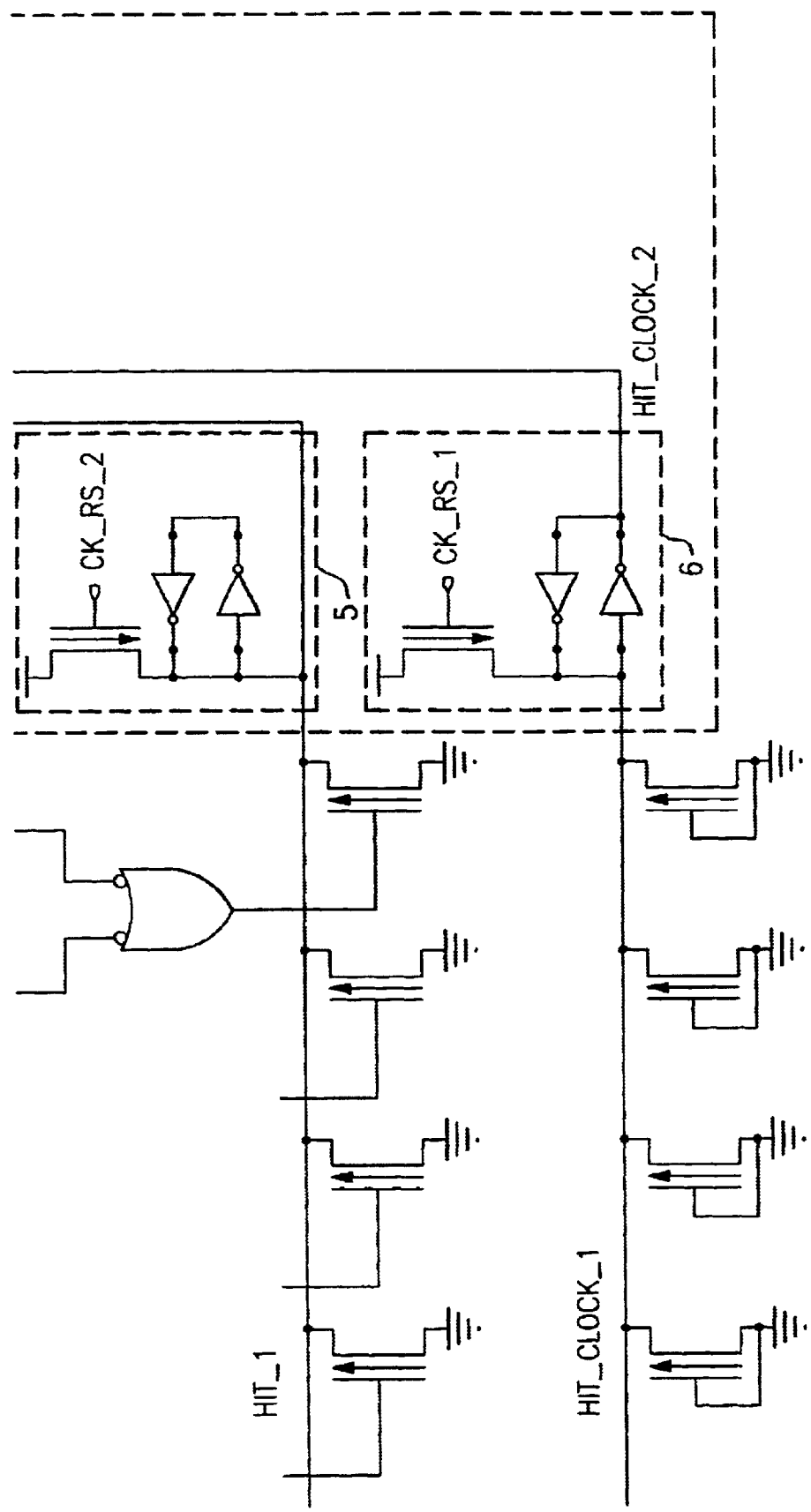

Referring to FIG. 2, if bit 0 or bit 1 . . . or bit 31 (from Address A) matches with its corresponding bits from "Address B", the assumed HIT is correct. This results in a HIT signal at the output 7 "HIT_OUT". The exact timing of the HIT signal is controlled by the arrival of the HIT clock signal (HIT_CLOCK_2) at the compare evaluation circuit 8. Likewise, if addresses A & B do not match, a MISS signal is maintained at the output "HIT_OUT" (the initial pre-charged state of the output).

Figure 4:
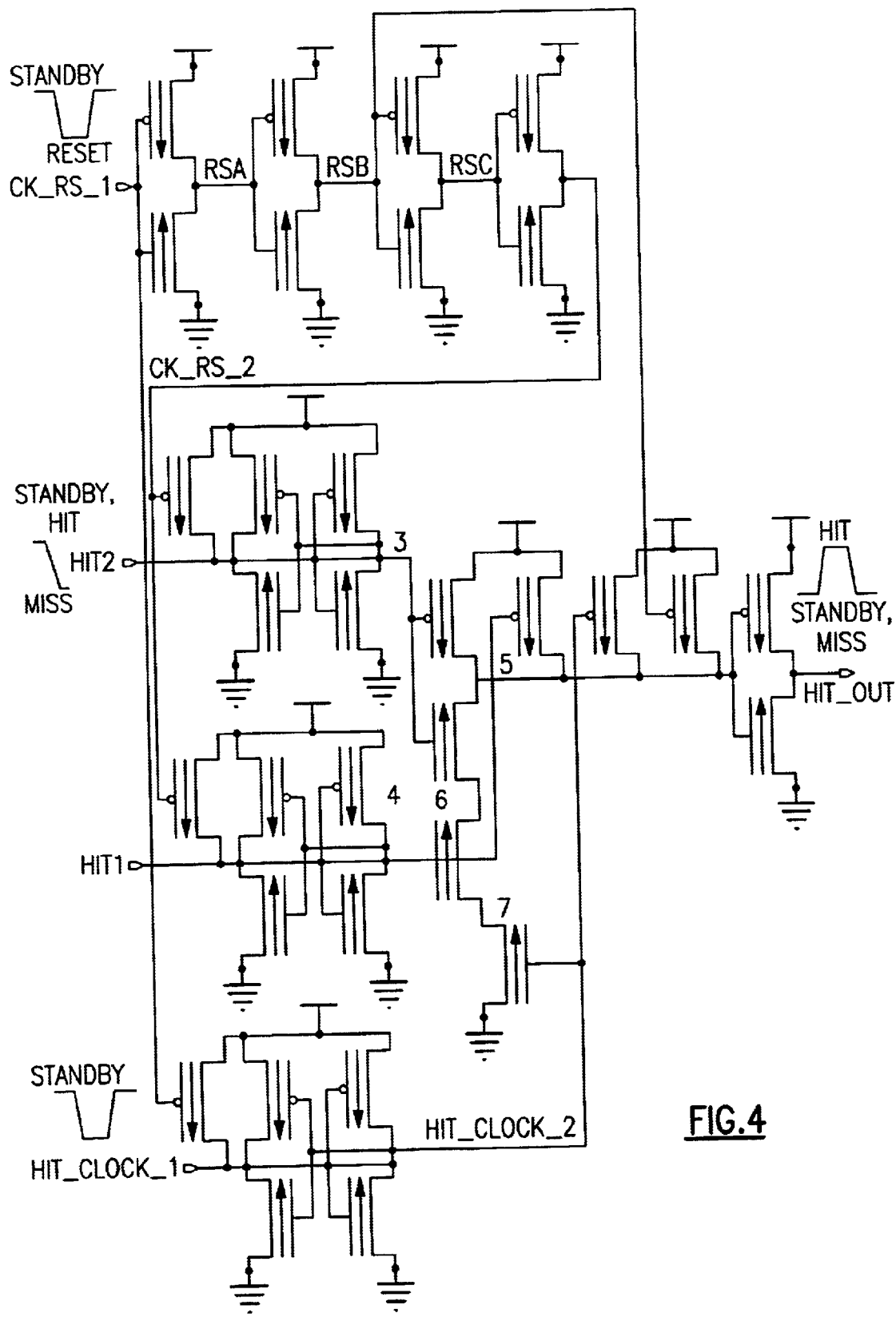
FIG. 4 illustrates the "compare evaluation circuit" circuit used in the present invention.
Figure 5:
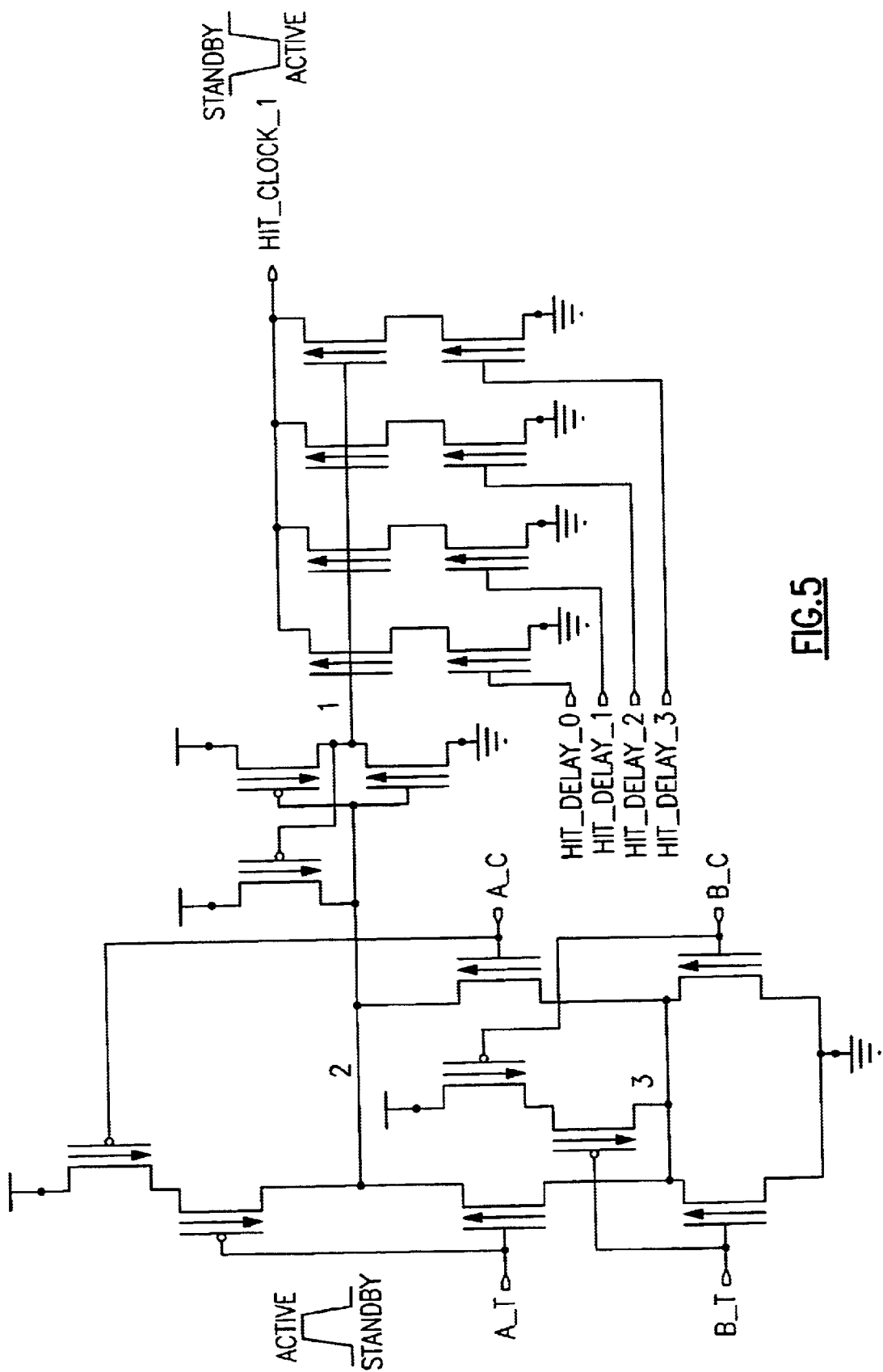
FIG. 5 illustrates the "HIT clock" circuit used in the present invention.

The compare evaluation circuit is comprised of a "AND" function 7, and its three inputs: HIT_1, HIT_2, & HIT_CLOCK_2. Notice HIT_1 & HIT_2 are connected to a parallel latch 5 to hold the results of individual miscompare operations, whereas, HIT_CLOCK_2 uses a series latch 6. The compare evaluation circuit is shown in detail in FIG. 4. The input latches 5 & 6 serve to hold the current state of HIT_1, HIT_2, & HIT_CLOCK_2 until the next evaluation cycle. At that time, a reset clock "CK_RS_1" will arrive to reset HIT_1, HIT_2, & HIT_CLOCK_2 to their stand-by state ("1" or high state) and the "HIT_OUT" to the "0" or MISS state.

Referring to FIG. 2, the HIT evaluation clock "HIT_CLOCK_1", is generated by the rising edges of the input address. The HIT evaluation clock circuitry 2 uses one input from each address A and B. This guarantees that the HIT evaluation clock "HIT_CLOCK_1" will wait until both addresses have arrived. The speed of the HIT clock circuitry is important because it must track with the bit compare circuits 3 under a wide range of environmental and manufacturing tolerance's. This is accomplished by mimicking the actual bit compare circuits with similar transistor topologies and equivalent FET loading on the HIT_CLOCK_1 and HIT_1 & HIT_2 nodes. The detail implementation of the HIT clock circuitry is shown in figue 5. Again referring to FIG. 2, the circuit delay from the arrival of address data to the active signal edge of HIT_CLOCK_1 (high-to-low transition) is nearly equal to the high-to-low transition of HIT_1 & HIT_2 during a miscompare. Ideally, this coincident timing relationship could be enough to perform a successful address compare function. However, due to tolerance and mis-tracking of device characteristics during normal manufacturing processes, such ideal situations seldom occur. To allow more timing margin between HIT_CLOCK_1 and HIT_1 & HIT_2, a series latch 6 is added to HIT_CLOCK_1. The extra inverter delay through the latch creates the signal HIT_CLOCK_2, which is then used to evaluate HIT_1 & HIT_2. Furthermore, If tracking is still a problem, four programmable delay inputs (HIT_DELAY_0, 1, 2, & 3) are included to slow down the HIT clock. These delay inputs can be adjusted externally during testing or system operation.

Figure 6:
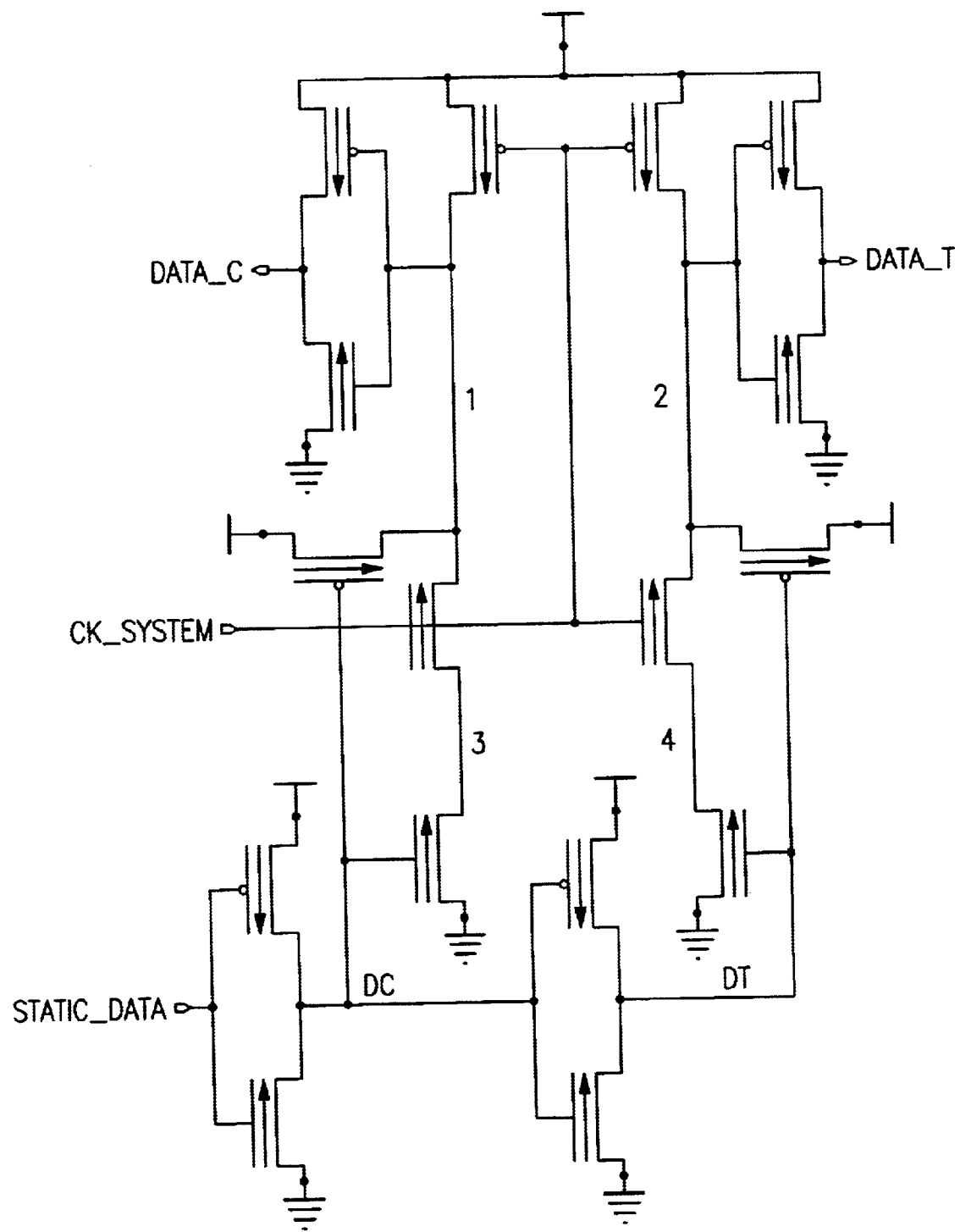
FIG. 6 illustrates the "receiver" circuit used in the present invention.

To create a reliable self-timed evaluation clock triggered off of the input data, only input signals that "return to zero" (i.e. return to the "non-asserted" state at the end of every cycle), are allowed to enter the bit compare circuits. If the inputs originate as "static" signals, they are first preconditioned at the input receiver, so when they arrive at the compare circuit, they have the necessary characteristic of a "return-to-zero" at the end of each cycle. This guarantees that no collisions will occur during pre-charge at the beginning of the next new cycle. FIG. 6, shows the input receiver circuit used to convert static signals to "return-to-zero" signals. The static input "STATIC_DATA" is "ANDed" together with the pulsed system clock "CK_SYSTEM". The result, are outputs DATA_T, & DATA_C that have the desired characteristic.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A self timed address compare circuit for comparing plural bit addresses, comprising:

an address input HIT clock circuit for providing a self-timed clock signal in response to the arrival of input data having a bit from each address input to the input HIT clock circuit, and a bit compare circuit activated upon the arrival of incoming addresses to be compared and comparing bits of said addresses, and a compare evaluation circuit for timing of a HIT evaluation clock signal, and a receiver for receiving an output of said compare evaluation circuit, whereby data clocking is reliably self-timed in response to the arrival of the input data insuring proper compare timing upon the arrival of the incoming addresses being compared by said bit compare circuit to generate an accurate internal HIT evaluation clock signal generated by the rising edges of the input data by said evaluation clock circuit.

2. The self timed address compare circuit according to claim 1 wherein said HIT evaluation clock signal generated by the rising edges of the input data by said evaluation clock circuit can be programmably delayed to increase the arrival times of input data and resulting in a greater operating window.

3. The self timed address compare circuit according to claim 2 wherein the input data normally is return-to-zero dynamic data at the-end of each cycle; and if the input data originates as static inputs to the bit compare circuit, then these static inputs are first preconditioned so when they arrive at the bit compare circuit, they have a "return-to-zero" characteristic at the end of each cycle.

4. The self timed address compare circuit according to claim 3 wherein a HIT evaluation clock signal which is generated in said HIT clock circuit using the rising edges of the input data, said HIT evaluation clock signal being used to trigger an evaluation of the bit compare circuit, said HIT clock circuit tracking any bit compare circuit delay by mimicking an actual bit compare circuit with similar transistor topologies.

5. The self timed address compare circuit according to claim 4 wherein said bit compare circuit has a open drain output connection and measures a plurality of addresses at a time and determines if they are equal.

6. The self timed address compare circuit according to claim 4 wherein the self-timed hit evaluation clock signal, which is generated by the rising edges of the input data by said evaluation clock circuit, also tracks the bit compare circuit delay even when simulation models have wide tolerances.

7. The self timed address compare circuit according to claim 4 wherein said HIT clock circuit has a plurality of programmable delay inputs which can be adjusted externally during testing or system operation to slow down the HIT clock.

8. The self timed address compare circuit according to claim 4 wherein said programmable delay is provided by programmable delay inputs which can be adjusted externally during testing or system operation to slow clocking down.

* * * * *